US010003561B2

(12) United States Patent
Duze et al.

(10) Patent No.: US 10,003,561 B2
(45) Date of Patent: Jun. 19, 2018

(54) CONVERSATION MODIFICATION FOR ENHANCED USER INTERACTION

(71) Applicant: MICROSOFT TECHNOLOGY LICENSING, LLC, Redmond, WA (US)

(72) Inventors: Charles Duze, Sammamish, WA (US); Mark Sunderland, Redmond, WA (US); Andrew Himberger, Redmond, WA (US); Tali Roth, Redmond, WA (US); Matthew Wood, Bellevue, WA (US); Ryan Gregg, Redmond, WA (US); David De La Brena, Redmond, WA (US); Malia Douglas, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 182 days.

(21) Appl. No.: 14/833,748

(22) Filed: Aug. 24, 2015

(65) Prior Publication Data

US 2017/0063760 A1   Mar. 2, 2017

(51) Int. Cl.
*G06F 15/16* (2006.01)
*H04L 12/58* (2006.01)

(52) U.S. Cl.
CPC ............ *H04L 51/16* (2013.01); *H04L 51/08* (2013.01); *H04L 51/12* (2013.01); *H04L 51/22* (2013.01); *H04L 51/063* (2013.01)

(58) Field of Classification Search
CPC ......... H04L 51/16; H04L 51/08; H04L 51/12; H04L 51/22
USPC ....................................................... 709/206
See application file for complete search history.

(56) References Cited

U.S. PATENT DOCUMENTS

| 6,631,398 | B1 | 10/2003 | Klein |
| 6,970,907 | B1 | 11/2005 | Ullmann et al. |
| 7,103,599 | B2 | 9/2006 | Buford et al. |
| 7,831,258 | B2 | 11/2010 | Coskun et al. |
| 8,510,664 | B2 | 8/2013 | Rueben et al. |
| 8,954,510 | B2 | 2/2015 | Chen et al. |
| 8,966,621 | B1 | 2/2015 | Johansson et al. |

(Continued)

FOREIGN PATENT DOCUMENTS

EP   2369820 A2   9/2011

OTHER PUBLICATIONS

"International Search Report and Written Opinion Issued in PCT Application No. PCT/US2016/047669", dated Nov. 21, 2016, 11 Pages.

(Continued)

Primary Examiner — Alan S Chou
(74) Attorney, Agent, or Firm — Turk IP Law, LLC (57) ABSTRACT

Technologies are described for modification of conversation presentation for enhanced user experience. Parts of the conversation may be detected and analyzed for their properties such as who sent a message, who received, when, was anyone left out from or added to the conversation, etc. The extracted properties and analyzed information may then be used to reverse a chronological order of the conversation and present it using interactive features such as collapsing and expanding parts of the presented information, providing a summary, removing unnecessary content, and comparable features.

17 Claims, 8 Drawing Sheets

(56) References Cited

U.S. PATENT DOCUMENTS

| | | | |
|---|---|---|---|
| 2003/0167310 A1 | 9/2003 | Moody et al. | |
| 2003/0195937 A1 | 10/2003 | Kircher et al. | |
| 2007/0234207 A1* | 10/2007 | Turakhia | G06Q 10/107 715/234 |
| 2010/0114562 A1 | 5/2010 | Hutchinson et al. | |
| 2012/0066070 A1 | 3/2012 | Cai et al. | |
| 2015/0032824 A1* | 1/2015 | Kumar | H04L 12/5825 709/206 |
| 2015/0032829 A1* | 1/2015 | Barshow | H04L 51/16 709/206 |

OTHER PUBLICATIONS

"Forward messages", Published on: Jan. 2, 2015 Available at: https://support.google.com/mail/answer/6586?hl=en.

"How should email threads be ordered?", Published on: Jun. 22, 2013 Available at: http://ux.stackexchange.com/questions/39670/how-should-email-threads-be-ordered.

Bridges, Dail, "Grouping emails by conversations", Published on: May 11, 2012 Available at: https://blogs.office.com/2012/05/11/grouping-emails-by-conversations/.

"Parsing Forwarded Emails", Published on: Mar. 1, 2010 Available at: http://stackoverflow.com/questions/2168719/parsing-forwarded-emails.

"Regex for parsing email body of forwarded message", Published on: Jan. 5, 2014 Available at: http://stackoverflow.com/questions/10793038/regex-for-parsing-email-body-of-forwarded-message.

"SecondWritten Opinion Issued in PCT Application No. PCT/US2016/047669", dated Jul. 3, 2017, 6 Pages.

"International Preliminary Report on Patentability Issued in PCT Application No. PCT/US2016/047669", dated Nov. 10, 2017, 7 Pages.

* cited by examiner

CONVERSATION MODIFICATION FOR ENHANCED USER INTERACTION

BACKGROUND

Communication applications provide the ability to exchange information over a multitude of modes. Email exchange, video conferences, audio calls, text or video messaging, desktop sharing, application sharing are some examples. In addition to providing the ability for instantaneous communication, such applications also enable users to maintain records of these conversations through an email chain, online conference recording, etc.

Thus, an email conversation that spans a long period of time and a large number of participants is not uncommon. While such records are useful in determining the context and history of the conversation, their presentation may degrade the user experience and make it difficult to obtain the needed information. For example, an email conversation is typically presented in reverse chronological order (with the most recent email at the top). Thus, a participant in the conversation would have to scroll down all the way to the bottom of the conversation to determine how it sinned and what the initial discussion included.

SUMMARY

This summary is provided to introduce a selection of concepts in a simplified form that are further described below in the Detailed Description. This summary is not intended to exclusively identify key features or essential features oldie claimed subject matter, nor is it intended as an aid in determining the scope of the claimed subject matter.

Embodiments are directed to conversation modification for enhanced user experience. A conversation may be analyzed to determine individual messages within the conversation. Next, properties associated with the individual messages may be parsed and a chronological order of the individual messages reversed. The conversation may then be presented with the reversed chronological order, parsed properties, and interactive features.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, a communication application or service may modify conversation presentation for enhanced user experience. Parts of the conversation may be detected and analyzed for their properties such as who sent a message, who received, when, was anyone left out from or added to the conversation, etc. The extracted properties and analyzed information may then be used to reverse a chronological order of the conversation and present it using interactive features such as collapsing and expanding parts of the presented information, providing a summary, removing unnecessary content, and comparable features.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the an will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including band-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for modification of conversation presentation for enhanced user experience. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Example embodiments are described herein using email conversations. Embodiments are not limited to email conversations, however. Other forms of conversations, where records are maintained in chronological order such as online conference recordings, desktop sharing sessions, text or video messaging sessions, and similar ones may also be modified for enhanced user experience using the principles discussed herein.

Figure 1:
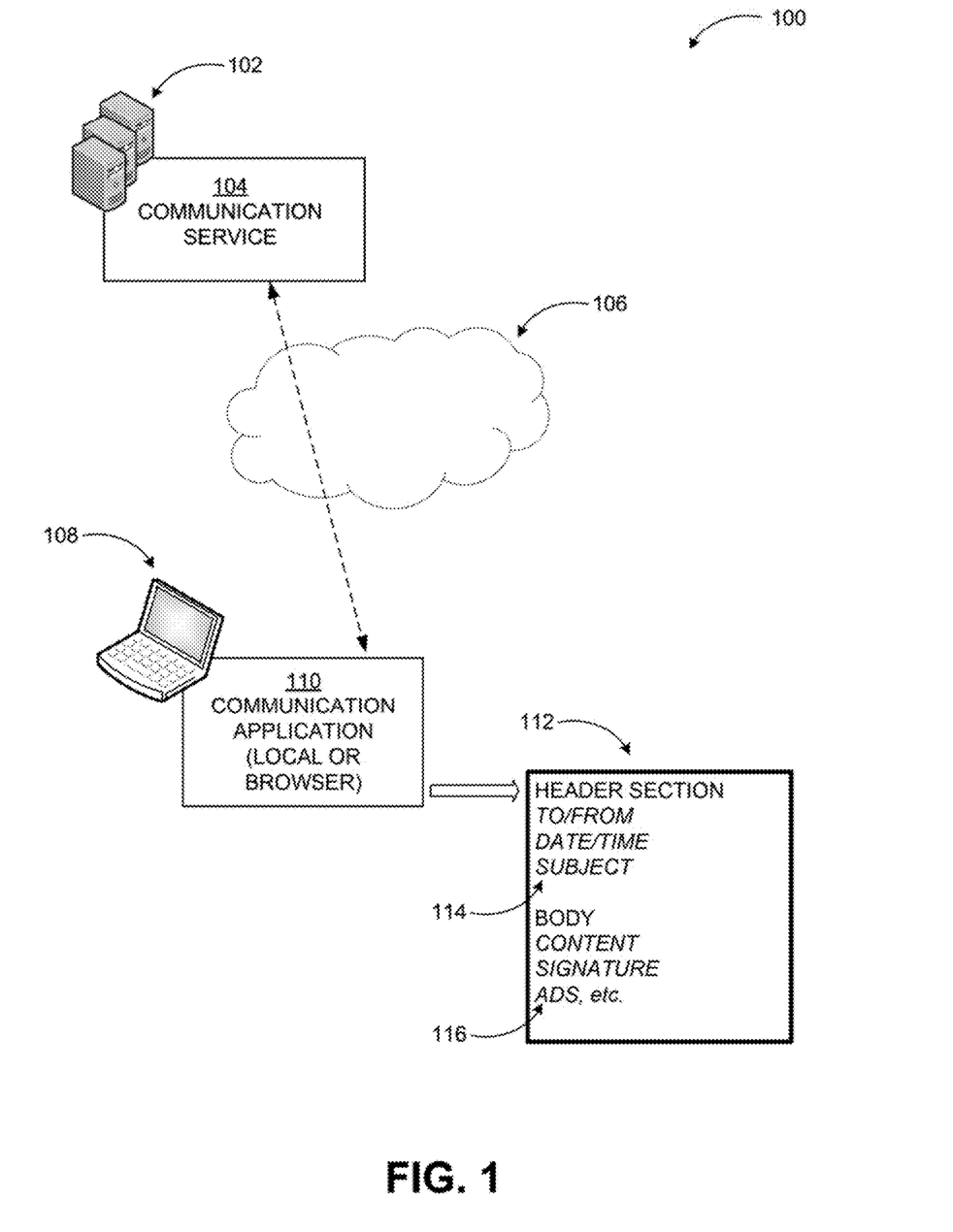
FIG. 1 includes an example system, where conversation modification for enhanced user experience may be implemented.

FIG. 1 includes an example system, where conversation modification for enhanced user experience may be implemented.

As shown in diagram 100, a communication application 110 may be a local application executed on a computing device 108 and facilitate multi-modal communications with other communication applications in a distributed manner over one or more networks such as network 106. In other embodiments, a communication service 104 executed on one or more servers 102 may manage the communications and users may access the service through client applications such as communication application 110. In yet other embodiments, the communication service 104 may be accessed through thin clients, i.e., browsers. The device 102 may include a desktop computer, a laptop computer, a tablet computer, a vehicle mount computer, a smart phone, or a wearable computing device, among other similar devices.

The multi-modal communications may include email exchange, video conferences, audio calls, text or video messaging, desktop sharing, application sharing, and comparable modes. In some modes or combinations of communications modes, the communication may span over a period of time (hours, days, weeks) and involve multiple people. Such communications may be managed and maintained as a conversation. The conversation record may include a flow of communications (content), participants, timings, and other properties associated with the individual communication sessions within the conversation. The conversation may be presented to participants with its content ordered in chronological order such that an oldest communication is at the bottom and a newest at the top. For example, an email conversation 112 may be presented as a connected series of entails with the individual messages on top of each other in the chronological order. Each message may include a header section 114 that includes a sender and recipient(s), date and time of the message, and a subject of the message. Each message may also include a body section 116 that includes the content of the message, an optional signature block, and optionally advertisements, inspirational messages, etc.

Thus, in an example email conversation, a user may see the newest message first and have to scroll to the bottom of the presented conversation to understand the beginning and a context of the conversation. Furthermore, repeated subject lines (in a typical conversation, the subject hue may not be changed as messages are sent back and forth through replies or forwards), participant lists, dates, signature blocks, etc. may distract the user from the flow of the content. Indeed, the repetitive display of the information may render the properties of the conversation to be less obvious.

Figure 2A:
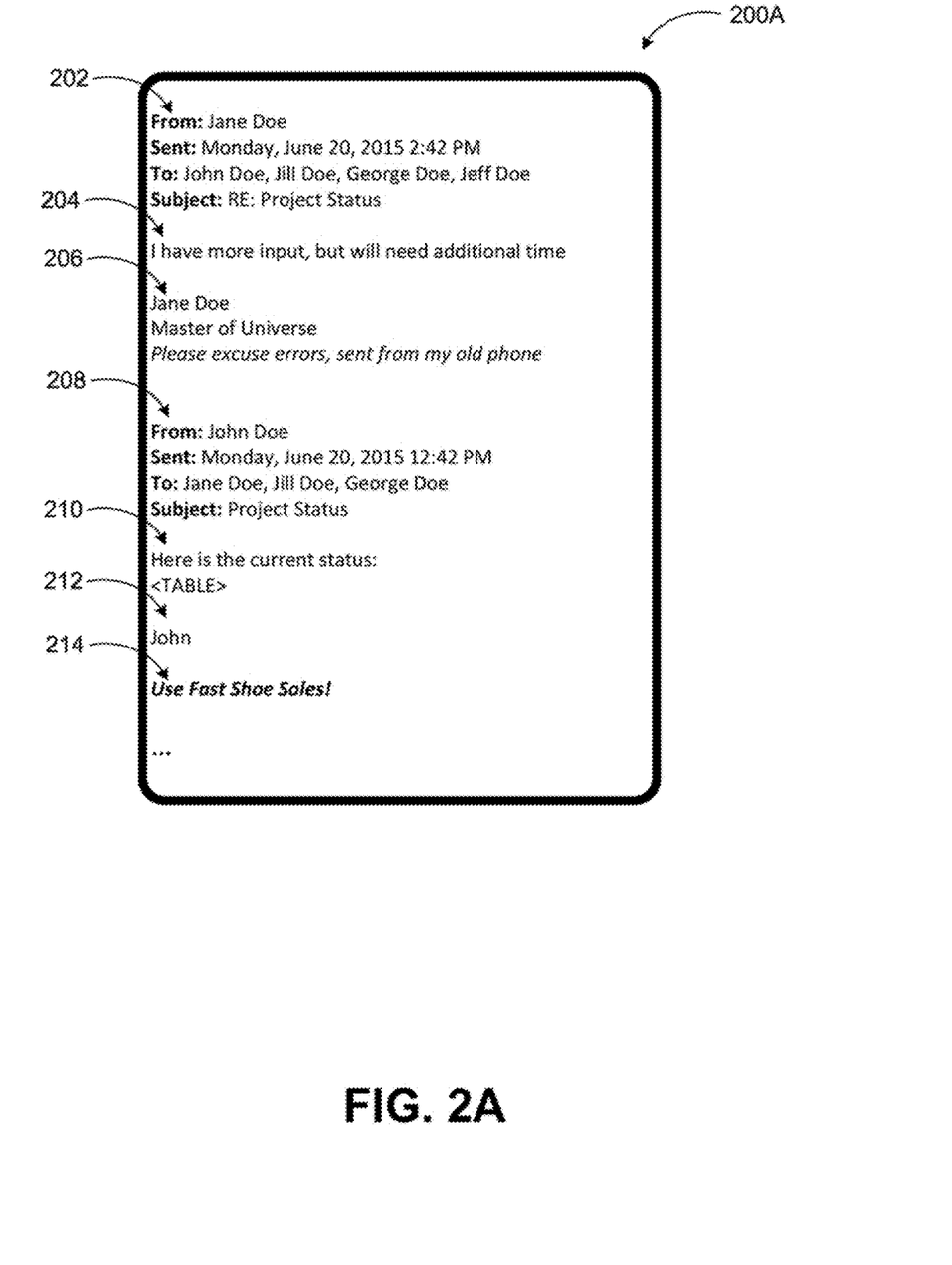
FIG. 2A illustrates an email conversation with example messages.

FIG. 2A illustrates an email conversation with example messages.

Example email conversation presentation 200A is shown with two example messages. The example conversation starts with the newest most recent) message at the top and goes chronologically toward the oldest (i.e., least recent) message at the bottom. The top message includes a header section 202 listing a sender and recipients of that message, date and time of when it was sent, and a subject line. The top message also includes a body section 204 that includes the actual message from the sender, and a signature block 206.

The second message, or the next recent one, includes header section 208 with similar information to the header section 202 of the top message, and a body section 210. Instead of the signature block, the second message includes the name of the sender 212 (may be typed by the sender as part of the body section) and an advertisement 214, which may be inserted automatically by the email service provider of the sender. The conversation may be in html format (including tags and other properties) or text format (no metadata).

As discussed above, the repeated header sections, signature block, advertisement, or even the typed name of a sender can distract a reader from the content flow of the conversation. Also, the reader may have to scroll through a lengthy conversation to understand the context of the conversation (when and how it started). Furthermore, changes in the conversation such as who was added when, who was left out by whom and when, etc., may not be easily detectable from the repetitive and similar looking header sections.

Figure 2B:
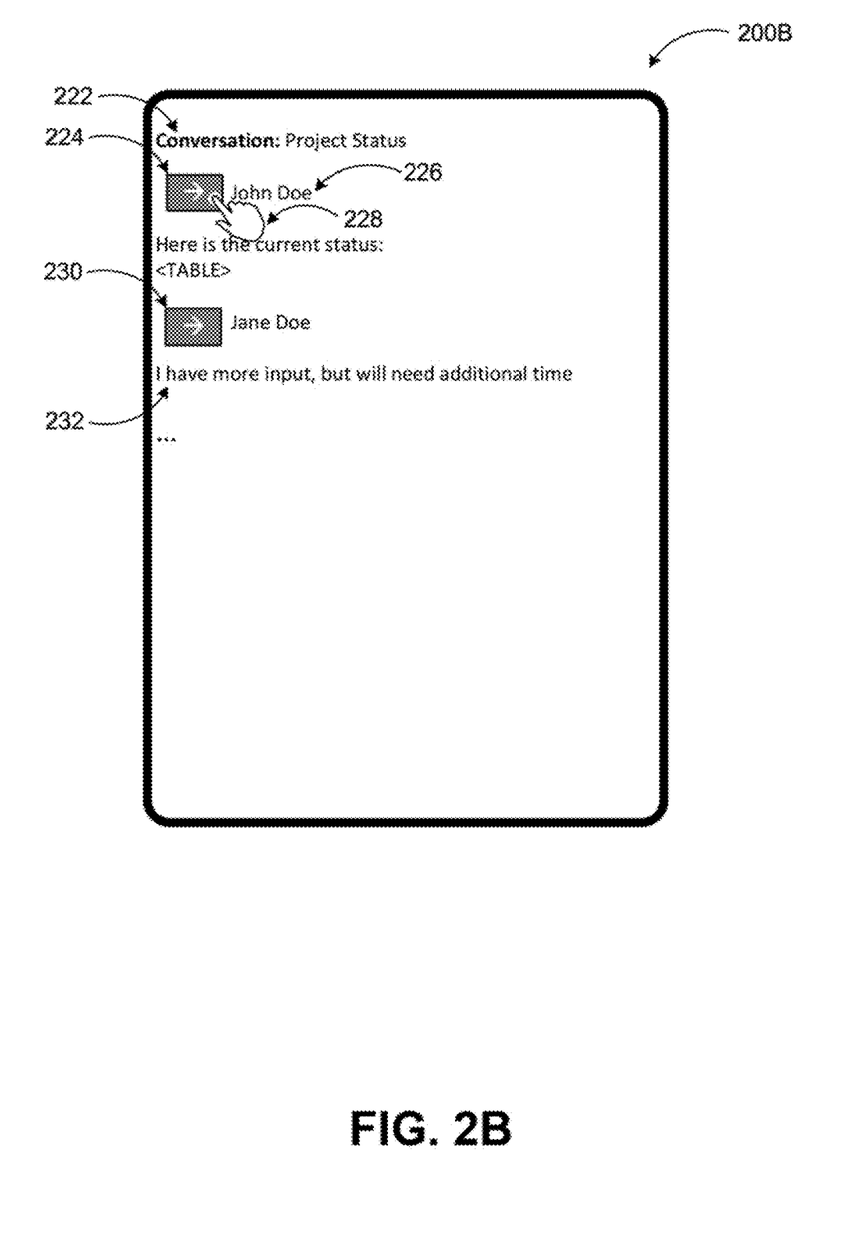
FIGS. 2B and 2C illustrate different presentations of the email conversation of FIG. 2A in a system according to embodiments
Figure 2C:
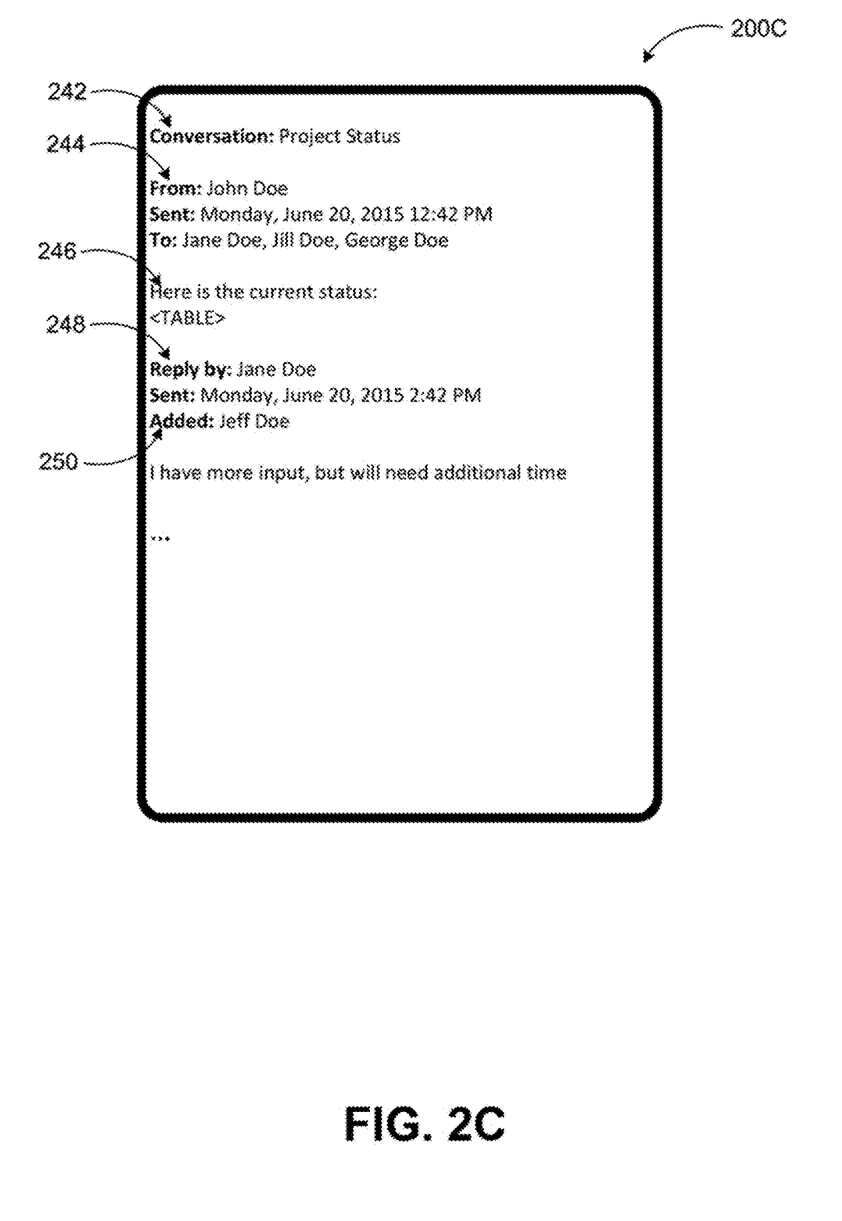

FIG. 2B and 2C illustrate different presentations of the email conversation of FIG. 2A in a system according to embodiments.

In the example conversation presentation 200B, the conversation 222 is identified and a chronological order of the messages reversed such that the second (older) message is displayed on top and the newer message is displayed at the bottom. The messages are presented in a collapsed manner, where the senders (e.g., fast sender 226) and the content of each message (e.g., body 232) are displayed. Expansion controls 224 and 230 may be presented such that details of individual messages can be displayed upon activation 228 of a control. Details may be presented temporarily or in a persistent manner upon activation of the expansion controls 224 and 230.

To arrive in example conversation presentation 200B, a conversation module within a communication application or service may analyze the conversation to determine individual messages within the conversation and parse properties associated with the individual messages. The properties may include a date and time of each individual message, a sender of each individual message, recipients of each individual message, added participants, removed participants, attachments, and/or other properties. The conversation module may then determine one or more interactive features to be presented based on the parsed properties. The interactive features may include, for example, collapsing and expanding all individual messages, collapsing and expanding select individual messages, providing a summary of the conversation, emphasizing portions of the conversation, enabling customization of an order of the individual messages, etc.

The conversation module may then reverse a chronological order of the individual messages based on the parsed properties and the conversation with the reversed chronological order and the one or more interactive features may be displayed for participants. The expansion controls 224 and 230 may be associated with individual messages as shown such that individual messages can be collapsed or expanded.

In some embodiments, one or more expansion controls may be provided to collapse and expand all or groups of messages too. To parse the properties of the individual messages, the conversation module may analyze metadata associated with the messages, tags and other features of html messages, or even content of text messages.

Example conversation presentation 200C shows another configuration, where the individual messages are in a semi expanded state. The conversation is again identified (242) and headers of individual messages 244 and 248 are displayed. But, instead of standard email header, the headers 244 and 248 provide information in a more easily understandable way. For example header 248 indicates that the second message is a reply by Jane Doe (e.g., as opposed to a forward) and that Jane added Jeff Doe instead of listing all participants. While content of the individual messages such as body 246 of the first message is displayed, signature blocks, advertisements, etc. are still removed to prevent distraction.

Figure 3:
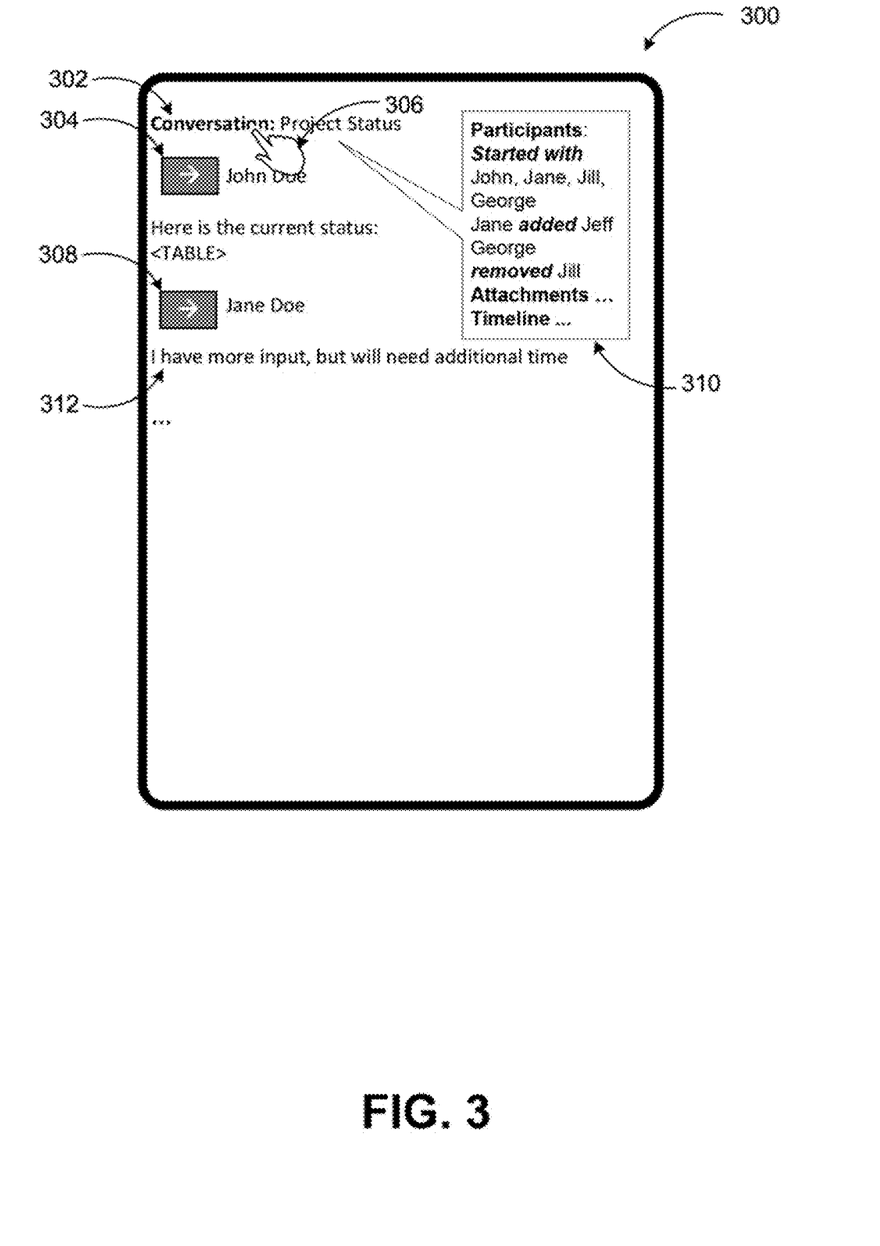
FIG. 3 illustrates another presentation of the email conversation of FIG. 2A in a system according to embodiments.

FIG. 3 illustrates another presentation of the email conversation of FIG. 2A in a system according to embodiments.

In example conversation presentation 300, the messages are displayed in collapsed state with expansion controls 304 and 308, and their respective content (e.g., body 312). Upon activation of a control such as selection 306 of the conversation identifier 302, a conversation summary 310 may be displayed providing summary information about the conversation. The conversation summary 310 may include further interactive features, which upon activation may cause additional detail information to be displayed.

In some embodiments, graphical, highlighting, textual, color, and/or shading schemes may be employed in the conversation summary or in the displayed conversation to emphasize important parts of the conversation, present information in a more user friendly manner, etc. Furthermore, the display order of the messages may not necessarily be forward or reverse chronological order. Users may be allowed, to customize the order of display for messages. For example, a newest message may be displayed at the top followed by the remaining messages in oldest-to-newest chronological order. In yet other embodiments, messages may be grouped, collapsed, expanded, and/or emphasized based on their content and context of the conversation.

As discussed above, a communication application or service providing conversation modification for enhanced user experience may enable reduced processor load (and consequently increased processing speed), conservation of memory, and reduced network bandwidth usage, among other features, that may improve the efficiency and performance of computing devices associated with the facilitated communications. For example, as a result of obtaining summarized information, users may reduce a number of repeated messages. Collapsed information may also be saved in that format reducing a need for data storage and memory. User interaction may also be optimized.

Embodiments, as described herein, address a need that arises from very large scale of operations created by software-based services that cannot be managed by humans. The actions/operations described herein are not a mere use of a computer, but address results of a system that is a direct consequence of software used as a service offered in conjunction with large numbers of users and applications.

The examples provided in FIG. 1 through 3 are illustrated with specific services, applications, communication modes, modules, module components, and configurations. Embodiments are not limited to environments according to these examples. Conversation modification for enhanced user experience may be implemented in environments employing fewer or additional services, applications, communication modes, modules, module components, and user experience configurations. Furthermore, the example services, applications, communication modes, modules, module components, and configurations shown in FIG. 1 through 3 may be implemented in a similar manner with other values using the principles described herein.

Figure 4:
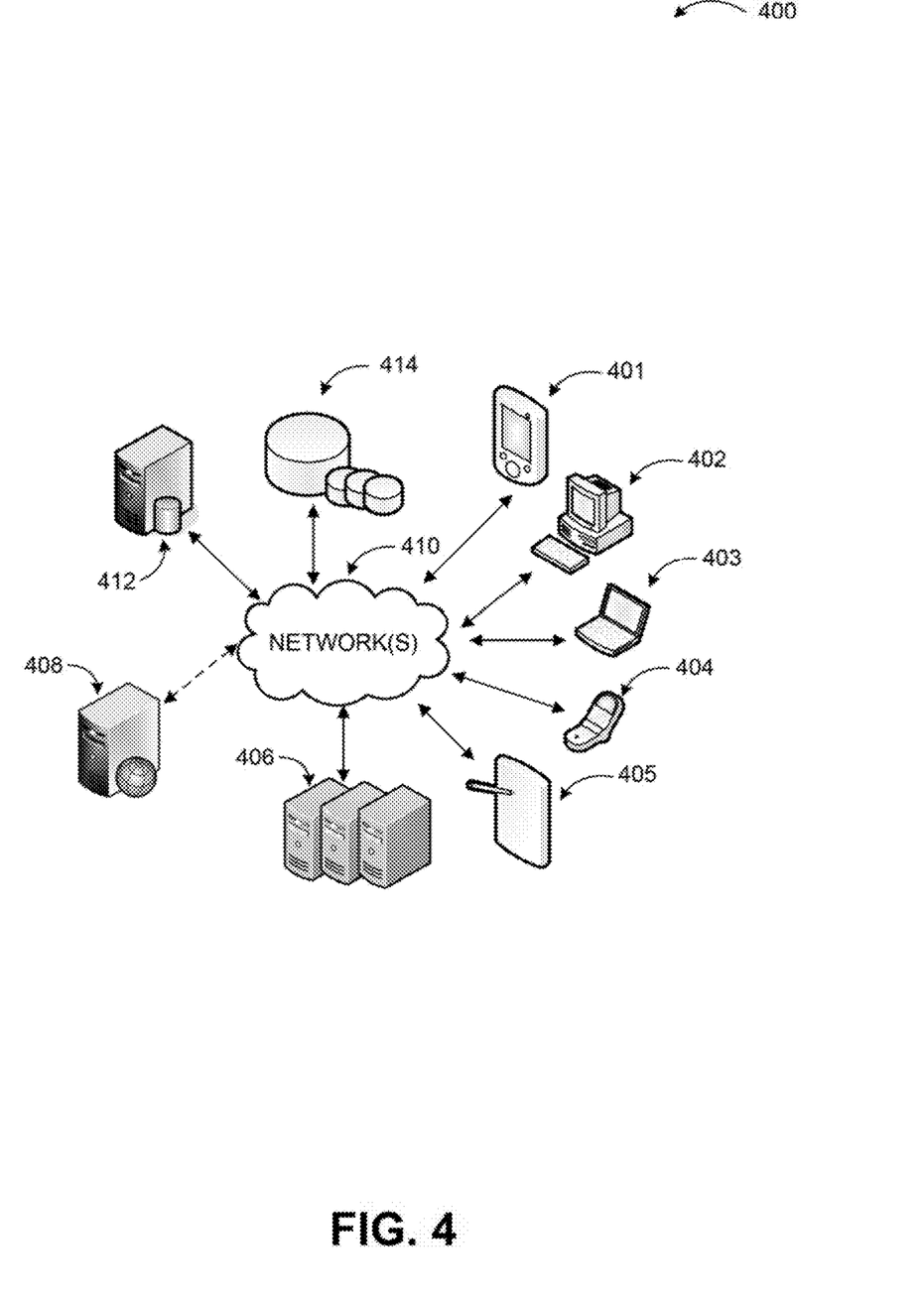
FIG. 4 is a networked environment, where a system according to embodiments may be implemented.

FIG. 4 is a networked environment, where a system according to embodiments may be implemented. In addition to locally installed applications, such as application 522 discussed below, conversation modification for enhanced user interaction may also be implemented in conjunction with hosted applications and services that may be implemented via software executed over one or more servers 406 or individual server 408. A hosted service or application may communicate with client applications on individual computing devices such as a handheld computer 401, a desktop computer 402, a laptop computer 403, a smart phone 404, a tablet computer (or slate), 405 ('client devices') through network(s) 410 and control a user interface presented to users.

Client devices 401-405 are used to access the functionality provided by the hosted service or application. One or more of the servers 406 or server 408 may be used to provide a variety of services as discussed above. Relevant data may be stored in one or more data stores (e.g., data store 414), which may be managed by any one of the servers 406 or by database server 412.

Network(s) 410 may comprise any topology of servers, clients, Internet service providers, and communication media. A system according to embodiments may have a static or dynamic topology. Network(s) 410 may include a secure network such as an enterprise network, an unsecure network such as a wireless open network, or the Internet. Network(s) 410 may also coordinate communication over other networks such as PSTN or cellular networks. Network(s) 410 provides communication between the nodes described herein. By way of example, and not limitation, network(s) 410 may include wireless media such as acoustic, RF, infrared and other wireless media.

Many other configurations of computing devices, applications, data sources, and data distribution systems may be employed to provide conversation modification for enhanced user interaction. Furthermore, the networked environments discussed in FIG. 4 are for illustration purposes only. Embodiments are not limited to the example applications, modules, or processes.

Figure 5:
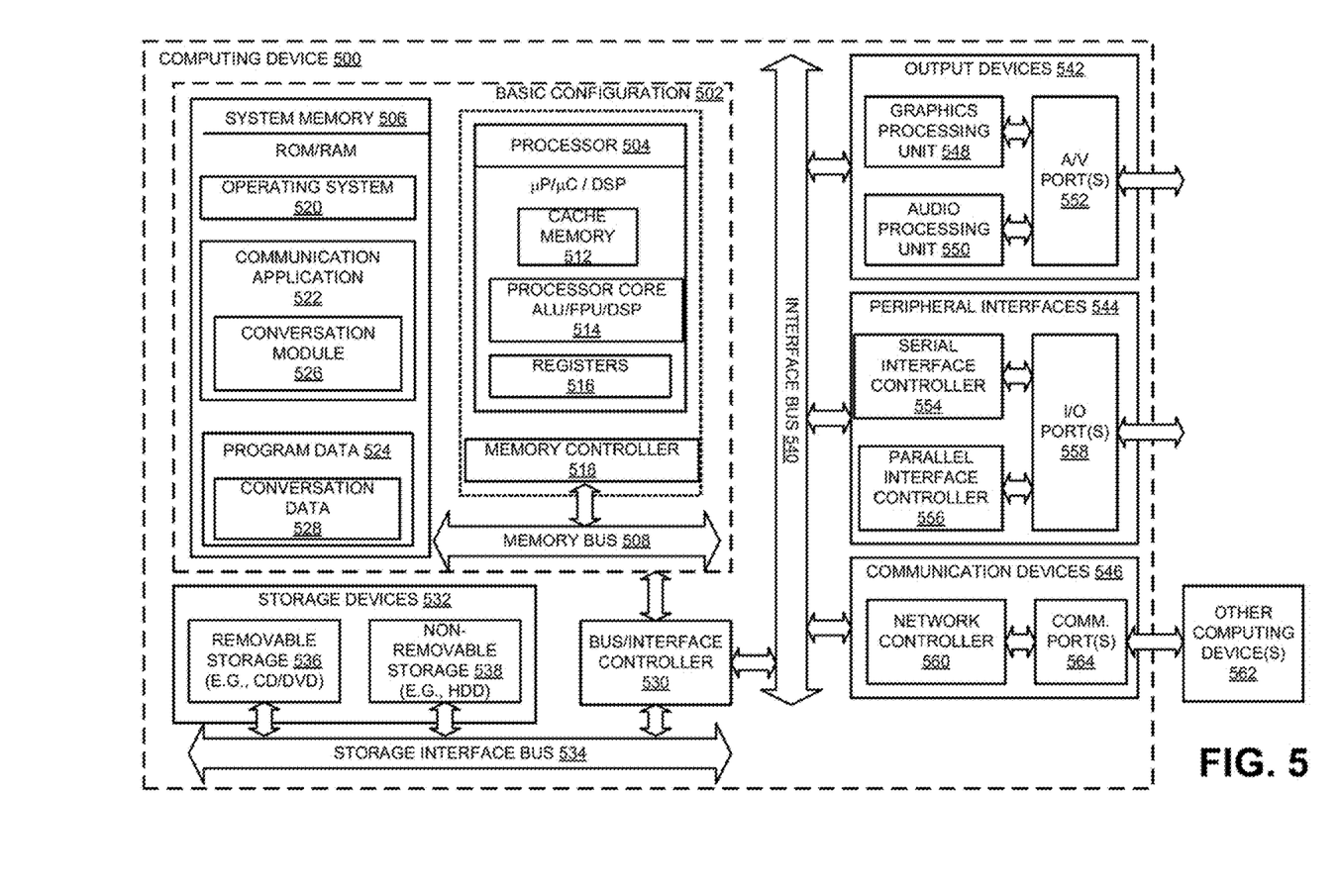
FIG. 5 is a block diagram of an example general purpose computing device, which may be used to provide conversation modification for enhanced user experience.

FIG. 5 is a block diagram of an example general purpose computing device, which may he used to provide conversation modification for enhanced user experience.

For example, computing device 500 may be used as a server, desktop computer, portable computer, smart phone, special purpose computer, or similar device. In an example basic configuration 502, the computing device 500 may include one or more processors 504 and a system memory 506. A memory bus 508 may be used for communicating between the processor 504 and the system memory 506. The basic configuration 502 is illustrated in FIG. 5 by those components within the inner dashed line.

Depending on the desired configuration, the processor 504 may be of any type, including but not limited to a microprocessor (μP), a microcontroller (μC), a digital signal processor (DSP), or any combination thereof. The processor 504 may include one more levels of caching, such as a level cache memory 512. one or more processor cores 514, and registers 516. The example processor cores 514 may (each)

include an arithmetic logic unit (ALU), a floating point unit (FPU), a digital signal processing core (DSP Core), or any combination thereof. An example memory controller 518 may also be used with the processor 504, or in some implementations the memory controller 518 may be an internal part of the processor 504.

Depending on the desired configuration, the system memory 506 may be of any type including but not limited to volatile memory (such as RAM), non-volatile memory (such as ROM, flash memory, etc.) or any combination thereof. The system memory 506 may include an operating system 520, a communication application 522, and program data 524. The communication application 522 may include a conversation module 526, which may be an integrated module of the communication application 522. In addition to managing conversations, facilitating data, collection and analysis, and managing stored conversation data associated with the communication application 522, the conversation module 526 may be configured to analyze parts of conversations and enhance their presentation, as described herein. The conversation module 526 may include specialized components, such as a data collection and an analysis engine, among other components. The program data 524 may include, among other data, conversation data 528, as described herein.

The computing device 500 may have additional features or functionality, and additional interfaces to facilitate communications between the basic configuration 502 and any desired devices and interfaces. For example, a bus/interface controller 530 may be used to facilitate communications between the basic configuration 502 and one or more data storage devices 532 via a storage interface bus 534. The data storage devices 532 may be one or more removable storage devices 536, one or more non-removable storage devices 538, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 506, the removable storage devices 536 and the non-removable storage devices 538 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (for example, one or more output devices 542, one or more peripheral interfaces 544, and one or more communication devices 546) to the basic configuration 502 via the bus/interface controller 530. Some of the example output devices 542 include a graphics processing unit 548 and an audio processing unit 550, which may be configured to communicate to various external devices such as a display or speakers via one or more A/V ports 552. One or more example peripheral interfaces 544 may include a serial interface controller 554 or a parallel interface controller 556, which may be configured to communicate with external devices such as input devices (for example, keyboard, mouse, pen, voice input device, touch input device, etc.) or other peripheral devices (for example, printer, scanner, etc.) via one or more I/O ports 558. An example communication device 546 includes a network controller 560, which may be arranged to facilitate communications with one or more other computing devices 562 over a network communication link via one or more communication ports 564. The one or more other computing devices 562 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed. in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a part of a general purpose or specialized server, mainframe, or similar computer that includes any of the above functions. The computing device 500 may also be implemented as a personal computer including both laptop computer and non-laptop computer configurations.

Example embodiments may also include methods to modify conversations for enhanced user interaction. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations white other operations may be performed by machines. These human operators need not be collocated with each other, but each can be only with a machine that performs a portion of the program in other embodiments, the human interaction can be automated such as by pre-selected criteria that may be machine automated.

Figure 6:
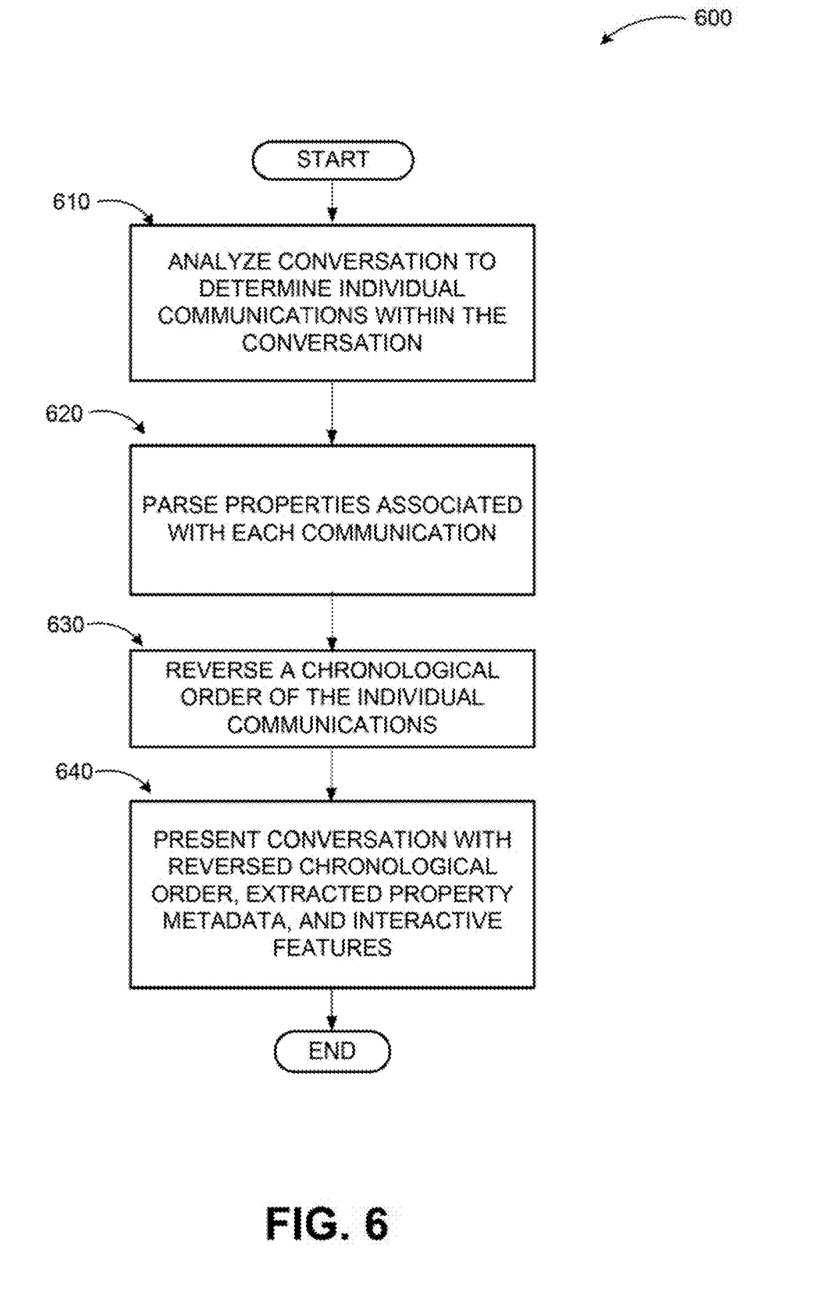
FIG. 6 illustrates a logic flow diagram of a method to provide conversation modification for enhanced user experience, according to embodiments.

FIG. 6 illustrates a logic flow diagram of a method to modify conversations for enhanced user interaction, according to embodiments.

Process 600 may be implemented on a computing device, server, or other system. An example system may include a communication application installed on a device, where a conversation module is integrated with the application. The conversation module may include specialized components, such as a data collection and analysis engine, among other components.

Process 600 begins with operation 610, where the conversation module may analyze a conversation and detect individual communications within the conversation such as emails. In the original conversation, the communications may be in reverse chronological order. In the email example, the conversation may be in simple text or html format. At operation 620, the conversation module may parse properties associated with each communication such as sender, recipients, date and time of transmission, whether new people were added to or existing people removed from the conversation. Other properties that may be extracted may include signatures, advertisements, and other content. In some embodiments, content may be analyzed to provide a summary of each communication.

At operation 630, the conversation module may reverse the chronological order of the conversation such that oldest message is presented at the top. In other embodiments, a most recent communication may be presented at the top followed by the remainder of messages in chronological order such that a conversation participant can read the most recent communication first, then follow the chronological order from the beginning of the conversation.

At operation 640, the conversation may be presented by the communication application in reverse chronological order with enhanced features such as interactivity added using the extracted properties.

The operations included in process 600 are for illustration purposes. Conversation modification for enhanced user interactivity may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

According to examples, a means for providing conversation modification for enhanced user experience is described. The means may include means for analyzing a conversation to determine individual messages within the conversation; means for parsing properties associated with the individual messages; means for determining one or more interactive features to be presented based on the parsed properties; means for reversing chronological order of the individual messages based on the parsed properties; and means for presenting the conversation with the reversed chronological order and the one or more interactive features.

According to some examples, a computing device to provide conversation modification for enhanced user experience is described. An example computing device may include a memory configured to store instructions and one or more processors coupled to the memory, the one or more processors configured to execute, in conjunction with the instructions stored in the memory, a communication application and a conversation module integrated with the communication application. The conversation module may analyze a conversation to determine individual communications within the conversation; parse properties associated with the individual communications; determine one or more interactive features to be presented based on the parsed properties; and reverse a chronological order of the individual messages based OD the parsed properties. The communication application may present the conversation with the reversed chronological order and the one or more interactive features.

According to other examples, the properties may include one or more of a date and time of each individual communication, a sender of each individual communication, recipients of each individual communication, added participants, removed participants, and attachments. The interactive features may include one or more of collapsing and expanding all individual communications, collapsing and expanding select individual communications, providing a summary of the conversation, emphasizing portions of the conversation, enabling customization of an order of the individual communications. The summary of the conversation may include one or more interactive elements to provide additional details about the conversation upon selection.

According to further examples, the collapsed and expanded individual communications may be presented with one or more interactive elements to enable toggling of a collapse/expansion state of the individual communications. The conversation module may be further configured to remove one or more advertisements from the conversation. The conversation module may also be configured to remove one or more signature blocks from the conversation. The conversation module may be configured to analyze the conversation by parsing content and tags of an html body of the conversation. The conversation module may be further configured to analyze the conversation by parsing content and tags of a text body of the conversation. The conversation module may also be configured to analyze the conversation by analyzing metadata associated with the individual communications. The individual communications may include one or more of email messages, text messages, video messages, online conference recordings, desktop sharing sessions, and application sharing sessions.

According to other examples, a method executed at least in part in a computing device to provide conversation modification for enhanced user experience is described. The method may include analyzing a conversation to determine individual messages within the conversation; parsing properties associated with the individual messages; determining one or more interactive features to be presented based on the parsed properties; reversing a chronological order of the individual messages based on the parsed properties; and presenting the conversation with the reversed chronological order and the one or more interactive features.

According to some examples, the properties may include one or more of: a date and time of each individual message, a sender of each individual message, recipients of each individual message, added participants, removed participants, and attachments; and the one or more interactive features may include one or more of collapsing and expanding all individual messages, collapsing and expanding select individual messages, providing a summary of the conversation, emphasizing portions of the conversation, enabling customization of an order of the individual messages.

According other examples, the method may also include employing one or more of a graphical scheme, a highlighting scheme, a textual scheme, a color scheme, and a shading scheme to provide the summary of the conversation and to emphasize the portions of the conversation. The method may further include removing content from the conversation, the content including one or more of advertisements, newsletter content, and signature blocks. The method may yet include prompting a user for confirmation prior to removing the content and/or presenting one or more interactive elements to enable temporary or persistent display of detailed information associated with content of the conversation and properties of the individual messages.

According to further examples, a computer readable memory device with instructions stored thereon to provide conversation modification for enhanced user experience is described. The instructions may include analyzing a conversation to determine individual messages within the conversation, where the individual messages are listed according to an newer-to-older chronological order; parsing properties associated with the individual messages; determining one or more interactive features to be presented based on the parsed properties; determining an order of the individual messages based on the parsed properties; and presenting the conversation with the new order and the one or more interactive features.

According to some examples, the new order may include an older-to-newer chronological order or a custom order. The custom order may include a newest message at a top of the conversation and remaining messages following the older-to-newer chronological order.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computing device to provide conversation modification for enhanced user experience, the computing device comprising:
    a memory configured to store instructions; and
    one or more processors coupled to the memory, the one or more processors configured to execute, in conjunction with the instructions stored in the memory, a communication application and a conversation module integrated with the communication application, wherein the conversation module is configured to:
        analyze a conversation to determine individual communications within the conversation;
        parse properties associated with the individual communications, wherein the properties include one or more of: a date and time of each individual communication, a sender of each individual communication, recipients of each individual communication, added participants, removed participants, or attachments:, and
        determine one or more interactive features associated with the individual communications to be presented based on the parsed properties; and
    wherein the communication application is configured to:
        present the conversation with the one or more interactive features, wherein the individual communications are re-ordered such that a newest communication is at a top and remaining communications are ordered according to the parsed properties, and wherein one or more individual communications in the conversation are presented in a collapsed state based on the parsed properties.

2. The computing device of claim 1, wherein the one or more interactive features include one or more of collapsing and expanding all individual communications, collapsing and expanding select individual communications, providing a summary of the conversation, or enabling customization of an order of the individual communications.

3. The computing device of claim 2, wherein the summary of the conversation includes one or more interactive elements to provide additional details about the conversation upon selection.

4. The computing device of claim 2, wherein the collapsed and expanded individual communications are presented with one or more interactive elements to enable toggling of a collapse/expansion state of the individual communications.

5. The computing device of claim 1, wherein the conversation module is further configured to remove one or more advertisements from the conversation.

6. The computing device of claim 1, wherein the conversation module is e:r configured to remove one or more signature blocks from the conversation.

7. The computing device of claim 1, wherein the conversation module is configured to analyze the conversation by parsing content and tags of an html body of the conversation.

8. The computing device of claim 7, wherein the conversation module is further configured to analyze the conversation by parsing content and tags of a text body of the conversation.

9. The computing device of claim 7, wherein the conversation module is further configured to analyze the conversation by analyzing metadata associated with the individual communications.

10. The computing device of claim 1, wherein the individual communications include one or more of email messages, text messages, video messages, online conference recordings, desktop sharing sessions, and application sharing sessions.

11. A method executed at least in part in a computing device to provide conversation modification for enhanced user experience, the method comprising:
    analyzing a conversation to determine individual messages within the conversation;
    parsing properties associated with the individual messages, wherein the properties include one or more of; a date and time of each individual message, a sender of each individual message, recipients of each individual message, added participants, removed participants, or attachments;
    determining one or more interactive features associated with the individual messages to be presented based on the parsed properties
    and
    presenting the conversation with the one or more interactive features, wherein the individual messages are re-ordered such that a newest message is at a top and remaining messages are ordered according to the parsed properties, and wherein one or more individual messages in the conversation are presented in a collapsed state based on the parsed properties.

12. The method of claim 11, wherein
the one or more interactive features include one or more of collapsing and expanding all individual messages, collapsing and expanding select individual messages, providing a summary of the conversation, or enabling customization of an order of the individual messages.

13. The method of claim 12, further comprising:
employing one or more of a graphical scheme, a highlighting scheme, a textual scheme, a color scheme, and a shading scheme to provide the summary of the conversation and to emphasize portions of the conversation.

14. The method of claim 11, further comprising:
removing content from the conversation, the content including, one or more of advertisements, newsletter content, and signature blocks.

15. The method of claim 14, further comprising:
prompting a user for confirmation prior to removing the content.

16. The method of claim 11, further comprising:
presenting one or more interactive elements to enable temporary or persistent display of detailed information associated with content of the conversation and properties of the individual messages.

17. A computer readable memory device with instructions stored thereon to provide conversation modification for enhanced user experience, the instructions comprising:
- analyzing a conversation to determine individual messages within the conversation;
- parsing properties associated with the individual messages, wherein the properties include one or more of; a date and time of each individual message, a sender of each individual message, recipients of each individual message, added participants, removed participants, or attachments;
- determining one or more interactive features associated with the individual messages to be presented based on the parsed properties;
and
- presenting the conversation with the one or more interactive features, wherein the individual messages are re-ordered such that a newest message is at a top and remaining messages are ordered according to the parsed properties, and wherein one or more individual messages in the conversation are presented in a collapsed state based on the parsed properties.

* * * * *